Sept. 9, 1930. G. J. ABBOTT 1,775,184
MILLING MACHINE
Filed Dec. 27, 1927 2 Sheets-Sheet 1
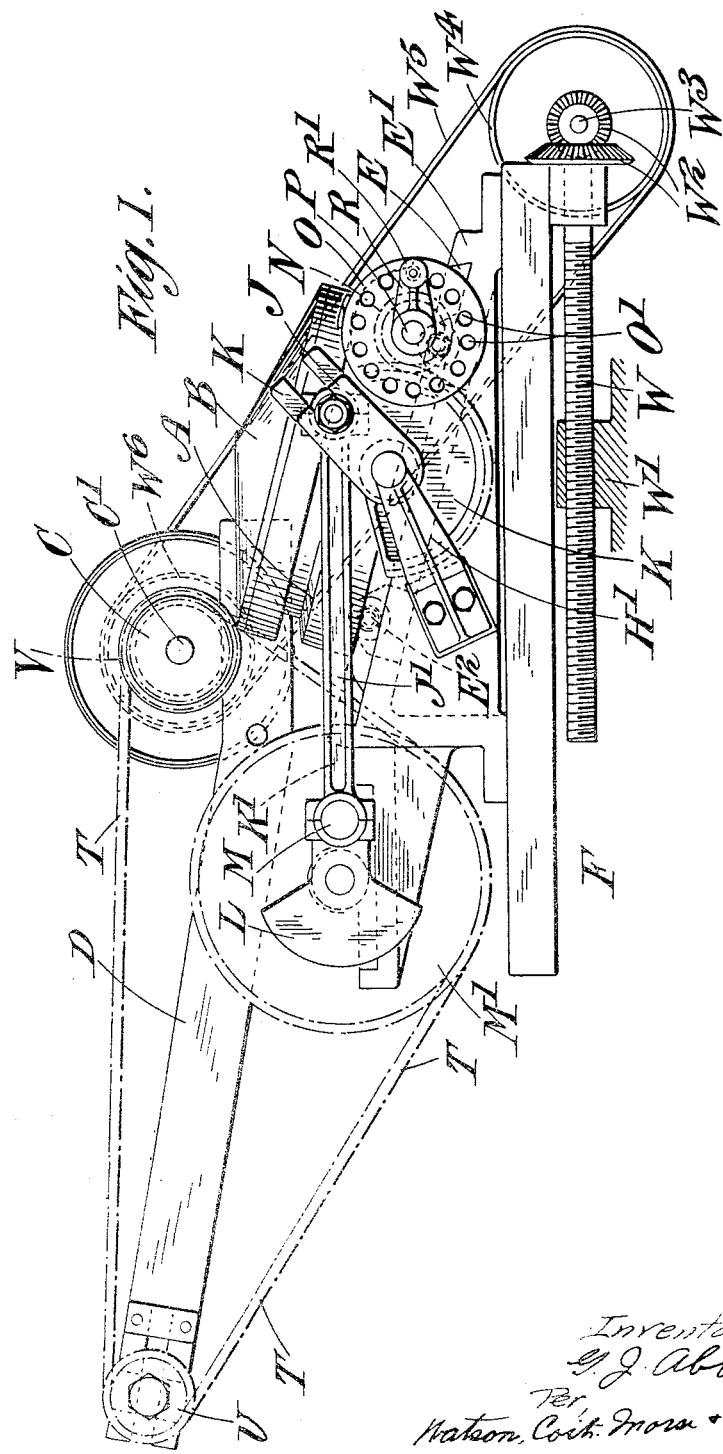

Sept. 9, 1930.　　　　G. J. ABBOTT　　　　1,775,184
MILLING MACHINE
Filed Dec. 27, 1927　　2 Sheets-Sheet 2
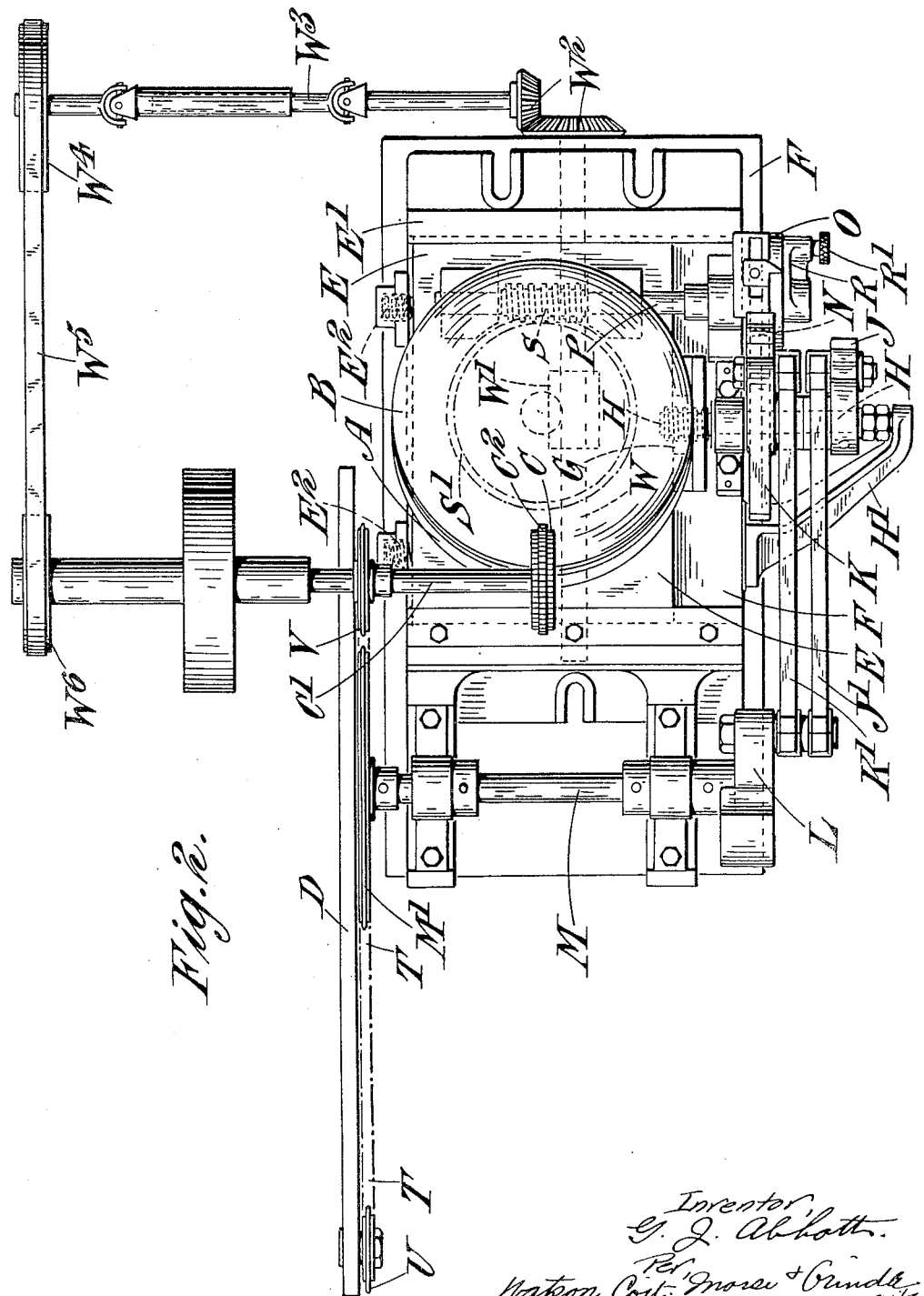

Patented Sept. 9, 1930

1,775,184

UNITED STATES PATENT OFFICE

GEOFFREY JOSEPH ABBOTT, OF LONDON, ENGLAND, ASSIGNOR TO P, I. V. CHAIN GEARS LIMITED, OF LONDON, ENGLAND, A COMPANY OF GREAT BRITAIN

MILLING MACHINE

Application filed December 27, 1927, Serial No. 242,831, and in Great Britain February 10, 1927.

This invention relates to machines for milling radial grooves in flat or bevelled discs such, for example, as those used to form the opposing faces of expanding pulleys.

The object of the invention is to provide a machine by means of which grooves of constant depth may be readily and cheaply cut truly radial, i. e. grooves bounded by two radii and an arc of the circumference of the disc.

Hitherto such grooves have been cut by means of a reciprocating tool in a shaping machine, the disc being caused to turn through a small angle during the return stroke of the tool in order to produce the desired feed. With this method, not only is no cutting performed during the return stroke, but small parallel ridges are left by the tool between each cut and these, when case hardened, tend to destroy the teeth of the chain or other driving member used with the pulley.

According to the present invention the machine is provided with mechanism for effecting relative oscillating movement between the worktable and the cutter across the groove, and with mechanism for simultaneously producing relative reciprocating movement between the cutter and the centre of the worktable, feed mechanism being also provided for effecting relative movement between the worktable and the cutter in a path approximately at right angles to the reciprocating movement.

Preferably in each case it is the worktable which is moved relatively to the cutter, the mechanism being such that the worktable is simultaneously oscillated about its centre, reciprocated so that the centre of the table is laterally displaced a distance equal to the width of the groove-forming portion of the cutter and, in addition, fed in a path approximately at right angles to such lateral displacement. It is necessary for the centre of the worktable to be laterally displaced, since the cutter must necessarily have an appreciable width, and only one edge of the cutter can follow a true radius of the disc. Hence, unless relative movement occurs between the centre of the table and the cutter to an extent equivalent to the width of the cutter, the groove formed will not be bounded by two radii, i. e. it will not be a true sector of the circular disc. For this reason the centre of the table is laterally displaced in a direction opposite to that in which the portion of the work being cut is turning.

The amplitude of the oscillation imparted to the table is equal to the width of the groove to be cut and the cross-section of the groove may be varied by altering the cross-sectional profile of the cutter.

It is important in machining discs of this type to make all the grooves of the same depth and for the faces of all the intervening teeth or ribs to be identical with one another. To this end, the cutter is mounted to rotate on a horizontal shaft in a vertical plane and is furnished with a projecting central portion so that the surfaces of the intervening teeth are milled simultaneously with the cutting of the grooves which separate them. Such an arrangement not only ensures a groove of constant depth but obviates the necessity for machining the face of the disc before it is milled and does away with the necessity for setting stops or like means for regulating the depth of the cut.

The invention may be carried into practice in various ways but one construction of machine according thereto is illustrated by way of example in the accompanying drawings in which Figure 1 illustrates the machine in elevation, and

Figure 2 is a plan.

In the construction illustrated in the drawing the machine comprises a circular worktable A mounted to rotate about its centre in a plane so inclined to the horizontal that the portion of the bevelled disc B beneath the cutter C occupies a horizontal plane. Any known means may be provided to adjust the inclination of the worktable.

The cutter C is mounted to rotate in a vertical plane on a horizontal shaft $C^1$ carried in bearings on the fixed frame of the machine, part of which is indicated at D, and is furnished with a projecting portion $C^2$ so that the surfaces of the intervening teeth are milled simultaneously with the cutting of the grooves which separate them.

The worktable A is carried upon an upper slide E adapted to reciprocate in guides $E^1$ in a direction substantially at right angles to the length of the groove being cut, the guides $E^1$ being secured to a lower slide F mounted on the fixed frame of the machine and provided with mechanism of any known kind to feed it under the cutter. This feed mechanism may comprise a screwthreaded shaft W on the slide F engaging with a fixed nut $W^1$ and rotated through bevel gearing $W^2$ from a splined telescopic shaft $W^3$ carrying a pulley $W^4$. The pulley $W^4$ is driven through a belt $W^5$ from a second pulley $W^6$ secured to the spindle $C^1$.

The upper slide E carries a nut G engaged by a screwthreaded spindle H, the outer end of which is supported by a bracket $H^1$. The spindle H carries a crank J rigidly secured thereto and also a toothed quadrant K constituting another crank which can rotate independently of the spindle. The crank J and quadrant K are both driven from a single crank L secured to a driving shaft M mounted in bearings formed in an extension of the lower slide F, the drive being transmitted to the crank J through a connecting rod $J^1$ and to the quadrant K through a connecting rod $K^1$. Since the radii of the crank J and the crank-forming portion of the quadrant K are greater than the radius of the driving crank L, J and K oscillate while the crank L rotates. The connecting rods $J^1$ and $K^1$ are attached to the crank J and quadrant K by means of adjustable pivots.

The toothed quadrant K engages with a pinion N secured to a disc O and loosely mounted on a spindle P supported in bearings on the lower slide F. To the spindle P is secured a handle R carrying a pin $R^1$ adapted to engage with a number of holes $O^1$ in the disc O. When the pin $R^1$ is in engagement with any one of the holes $O^1$ the movement imparted to the pinion N by the quadrant K is transmitted to the spindle P which carries a worm S engaging with a worm wheel $S^1$ secured to the spindle of the worktable A. Thus the oscillations of the quadrant are transmitted to the worktable A through the pinion N, worm S, and worm wheel $S^1$, the gear ratios being so arranged that the amplitude of the oscillations executed by the table is equal to the width of the groove being cut. Simultaneously the movement of the crank J causes the spindle H to oscillate, thus imparting a reciprocating motion to the nut G and the slide E in a direction substantially at right angles to the length of the groove, this part of the mechanism being so arranged that the centre of the table is laterally displaced in a direction opposite to that in which the portion of the work being cut is rotating. Buffer springs $E^2$ may be provided if desired to facilitate the return movement of the slide towards the crank J.

The amplitude of the oscillations executed by the table A and therefore the width of the groove being cut, may be changed by varying the effective radius of the crank-forming portion of the quadrant K. Similarly the travel of the reciprocating slide E may be adjusted in accordance with the width of the cutter by varying the effective radius of the crank J, the independent drive of the crank J and quadrant K permitting these adjustments to be made independently of one another.

The crank shaft M by means of which the worktable A is simultaneously oscillated and caused to reciprocate carries a sprocket wheel $M^1$ driven by a chain T passing over a driving sprocket U mounted on the fixed framework D of the machine and also over a third sprocket V secured to the spindle $C^1$ of the cutter C. The crank shaft M is therefore continuously rotated by the chain T during the movement of the table under the influence of the feed mechanism, since the chain always engages the sprocket $M^1$ to a sufficient extent to secure the desired drive.

In operation the effective radii of the crank J and the crank-forming portion of the quadrant K are first adjusted in accordance with the width of the cutter employed and with the width of the groove to be cut. The pin $R^1$ is then inserted in one of the holes $O^1$ in the disc O and the machine started up, the feed mechanism moving the lower slide F, together with the mechanism mounted thereon, including the shaft M and sprocket $M^1$, relatively to the cutter, while the worktable A is simultaneously oscillated and reciprocated in the manner already described. When one groove is completed, the pin $R^1$ is withdrawn from the hole $O^1$ and the handle R is turned until the pin is opposite the next hole $O^1$, thus rotating the table A about its centre until the cutter C is in the correct position for cutting the next groove. The pin $R^1$ is then inserted in the hole and the operation is repeated as described above.

The pitch of the grooves may be changed by varying the extent to which the table A is rotated between the cutting of each successive groove, and to facilitate this the disc O may be provided with a relatively large number of closely spaced holes $O^1$.

It is to be understood that although a machine according to this invention has been particularly described for the cutting of radial grooves in bevelled discs, it is not limited to such an application and may equally well be employed for cutting such grooves in flat discs. Further, the details of construction of the particular mechanism employed to impart the necessary movements to the worktable and/or tool may be varied without departing from this invention.

What I claim as my invention and desire to secure by Letters Patent is:—

1. In a milling machine for cutting radial grooves in flat or bevelled discs, the combination of a worktable, a cutter, means for effecting relative oscillating movement between the worktable and the cutter across the groove being cut, and mechanism for simultaneously producing relative reciprocating movement between the cutter and the centre of the worktable in a direction substantially transverse to the mean direction of the groove being cut to compensate for the width of the groove forming portion of the cutter.

2. In a milling machine for cutting radial grooves in flat or bevelled discs, the combination of a worktable, a cutter, means for effecting relative oscillating movement between the worktable and the cutter across the groove being cut, mechanism for simultaneously producing relative reciprocating movement between the cutter and the centre of the worktable in a direction substantially transverse to the mean direction of the groove being cut, and feed mechanism for effecting relative movement between the cutter and the worktable at approximately right angles to the reciprocating movement to compensate for the width of the groove forming portion of the cutter.

3. In a milling machine for cutting radial grooves in flat or bevelled discs, the combination of a worktable, a cutter, mechanism for oscillating the worktable about its centre, and mechanism for simultaneously displacing it bodily in a direction opposite to that in which the portion of the work being cut is turning, through a distance equal to the width of the groove-forming portion of the cutter.

4. In a milling machine for cutting radial grooves in flat or bevelled discs, the combination of a workable, a cutter, means for effecting relative oscillating movement between the worktable and the cutter across the groove through an angle equal to the angle subtended by the radial sides of the groove being cut, mechanism for simultaneously producing relative reciprocating movement between the cutter and the centre of the worktable in a direction substantially transverse to the mean direction of the groove being cut, and feed mechanism for effecting relative movement between the cutter and the worktable at approximately right angles to the reciprocating movement to compensate for the width of the groove forming portion of the cutter.

5. In a milling machine for cutting radial grooves in flat or bevelled discs, the combination of a worktable, a cutter, mechanism for causing the worktable to execute about its centre oscillations through an angle equal to the angle subtended by the radial sides of the groove, and mechanism for simultaneously displacing the worktable bodily in a direction opposite to that in which the portion of the work being cut is turning, through a distance equal to the width of the groove-forming portion of the cutter.

6. In a milling machine for cutting radial grooves in flat or bevelled discs, the combination of a worktable, a cutter, mechanism for oscillating the worktable about its centre, a screwthreaded shaft, means for turning this shaft to reciprocate the table in a direction substantially transverse to the mean direction of the groove being cut to compensate for the width of the groove forming portion of the cutter, and an operative connection between said means and the mechanism for oscillating the table.

7. In a milling machine for cutting radial grooves in flat or bevelled discs, the combination of a worktable, a cutter, mechanism for causing the worktable to execute about its centre oscillations through an angle equal to the angle subtended by the radial sides of the groove being cut, a screwthreaded shaft, means for turning said shaft to reciprocate the table in a direction substantially transverse to the mean direction of the groove being cut to compensate for the width of the groove forming portion of the cutter, and an operative connection between said means and the mechanism for oscillating the table.

8. In a milling machine for cutting radial grooves in flat or bevelled discs, the combination of a worktable, a cutter, mechanism for oscillating the worktable about its centre, a screwthreaded shaft, means for turning said shaft to reciprocate the table in a direction substantially transverse to the mean direction of the groove being cut to compensate for the width of the groove forming portion of the cutter, one or more springs against the action of which the table is adapted to reciprocate, an operative connection between the means for turning the screwthreaded shaft and the mechanism for oscillating the table, and feed mechanism for effecting relative movement between the cutter and the worktable at approximately right angles to the reciprocating movement.

9. In a milling machine for cutting radial grooves in flat or bevelled discs, the combination of a worktable, a cutter, a rotatable screwthreaded shaft, a fixed nut engaged thereby, a crank secured to the screwthreaded shaft, and a second crank having a shorter throw than the first crank and so connected thereto that rotation of the second crank causes oscillation of the screwthreaded shaft and consequently reciprocation of the table in a direction substantially transverse to the mean direction of the groove being cut to compensate for the width of the groove forming portion of the cutter.

10. In a milling machine for cutting radial grooves in flat or bevelled discs, the combination of a worktable, a cutter, a rotatable screwthreaded shaft, a fixed nut engaged thereby, a crank secured to the screwthreaded shaft, a second crank having a shorter throw than the first crank and so connected thereto that rotation of the second crank causes oscillation of the screwthreaded shaft and consequently reciprocation of the table in a direction substantially transverse to the mean direction of the groove being cut to compensate for the width of the groove forming portion of the cutter, and one or more springs against the action of which the table is adapted to reciprocate.

11. In a milling machine for cutting radial grooves in flat or bevelled discs, the combination of a worktable, a cutter, a toothed quadrant, a crank having a shorter throw than the effective radius of the quadrant, a connecting rod between the crank and the quadrant, through which the quadrant is oscillated, gearing actuated by the quadrant for oscillating the table about its centre, a screwthreaded shaft rotatably mounted on the table, a fixed nut engaged by said shaft, a second crank secured to the screwthreaded shaft, said crank having a longer throw than the first crank, a rod so connecting the cranks that rotation of the first crank causes oscillation of the screwthreaded shaft and consequently reciprocation of the table in a direction substantially transverse to the mean direction of the groove being cut to compensate for the width of the groove forming portion of the cutter, and feed mechanism for effecting relative movement between the cutter and the table at approximately right angles to the reciprocating movement.

12. In a milling machine for cutting radial groves in flat or bevelled discs, the combination of a driving sprocket secured to the rotary cutter spindle, a second sprocket carried by a fixed portion of the machine frame, a crankshaft carried by a movable portion of the machine and adapted to drive mechanism mounted on a movable portion of the machine, feed mechanism for traversing the movable portion of the machine, a relatively large driven sprocket secured to the crankshaft and disposed between the said two smaller sprockets, and a chain passing over all three sprockets so that in spite of the feeding movement imparted to the movable portion of the machine the driven sprocket is always in engagement with the chain.

13. In a milling machine for cutting radial grooves in flat or bevelled discs, the combination of a worktable, a cutter, mechanism for oscillating the worktable about its centre, means for simultaneously displacing the worktable bodily in a direction opposite to that in which the portion of the work being cut is turning, through a distance equal to the width of the cutting portion of the tool, and means for independently adjusting the amplitude of the oscillations and also the extent to which the worktable is reciprocated.

14. In a milling machine for cutting radial grooves in flat or bevelled discs, the combination of a worktable, a cutter, a toothed quadrant, a crank having a shorter throw than the effective radius of the quadrant, a connecting rod between the crank and the quadrant through which the quadrant is oscillated, gearing actuated by the quadrant for oscillating the table about its centre, a rotatable screwthreaded shaft, a fixed nut engaged by said shaft, a second crank secured to the screwthreaded shaft, said crank having a longer throw than the first crank, a rod so connecting the cranks that rotation of the first crank causes oscillation of the screwthreaded shaft and consequently reciprocation of the table in a direction substantially transverse to the mean direction of the groove being cut to compensate for the width of the groove forming portion of the cutter, means for independently adjusting the effective radii of the second crank and of the crank-forming portion of the quadrant, and feed mechanism for effecting relative movement between the cutter and the table at approximately right angles to the reciprocating movement.

In testimony whereof I have signed my name to this specification.

GEOFFREY JOSEPH ABBOTT.